Dec. 8, 1942.  M. P. JACKLINE  2,304,459
HAND TOOL
Filed May 27, 1940
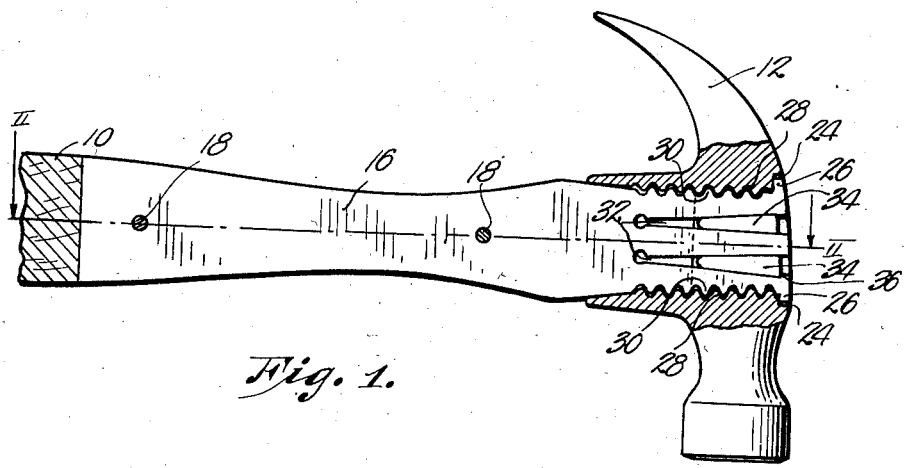
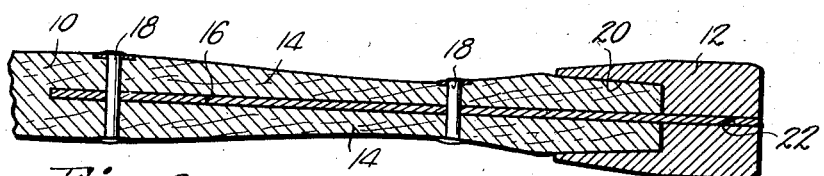
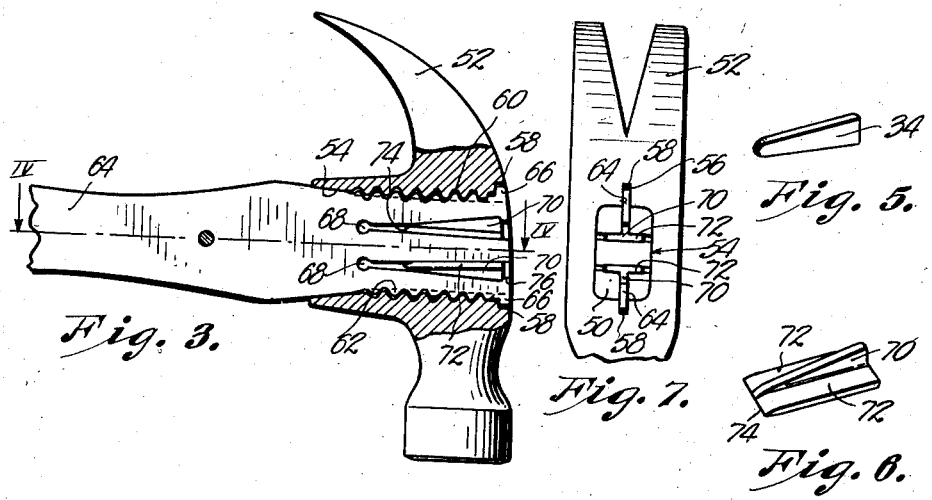
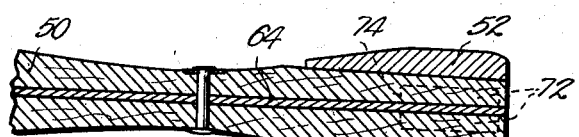
INVENTOR.
Morley Pyson Jackline
BY
ATTORNEYS Patented Dec. 8, 1942

2,304,459

UNITED STATES PATENT OFFICE 2,304,459

HAND TOOL

Morley Pyson Jackline, Kansas City, Kans.

Application May 27, 1940, Serial No. 337,397

5 Claims. (Cl. 306—32)

This invention relates to hand tools of the nature having normally separable heads and handles, and the primary object of the invention is to provide novel means for interconnecting the said heads and handles of tools so that accidental displacement will not occur.

One of the important aims of this invention is the provision of means for interconnecting the heads and handles of well-known tools, which comprises specially forming the head and equipping the handles with plates, the nature of which allows an interlocking relationship with the heads so that the desired result of securing the parts together is attained.

This invention has for a further aim the provision of a hand tool, the head and handle of which are arranged so as to interlock when the wedges forming a part of the tool are driven to position, said wedges being engaged by detents for the purpose of precluding accidental displacement.

A yet further aim of the invention is to provide a hand tool having a head wherein is provided a cavity and slot, the same being in communication and adapted to receive a portion of the handle and a part of a specially designed plate that is carried by the handle respectively.

A further object of this invention is to provide a novel wedge for tools of the aforementioned character, the nature of which wedge permits simultaneously expanding the handle and plate at the zone of juncture between the handle and head of the tool so that portions of the plate are moved outwardly into the slot as the wooden handle is tightened in the cavity.

Two illustrated embodiments of the invention are shown in the accompanying drawing, wherein:

Figure 1 is a fragmentary longitudinal sectional view through a portion of a hand tool embodying the present invention.

Fig. 2 is a fragmentary longitudinal sectional view taken on line II—II of Fig. 1.

Fig. 3 is a fragmentary longitudinal sectional view through a hand tool made in accordance with a modified form of the invention.

Fig. 4 is a fragmentary longitudinal sectional view taken on line IV—IV of Fig. 3.

Fig. 5 is a perspective view of the wedge employed in the form of the invention shown in Figs. 1 and 2.

Fig. 6 is a perspective view of the type of wedge employed in a hand tool made to embody the modified form of the invention as seen in Figs. 3 and 4; and Fig. 7 is a fragmentary end elevational view of the hand tool shown in Fig. 3.

While the following specification refers specifically to the form of hand tool illustrated in the drawing, it must be understood that the means for joining the wooden handle 10 and head 12 of the hammer, shown, may be employed in interconnecting similar parts of any conventional hand tool.

Referring to Figs. 1, 2 and 5, handle 10 is bifurcated at one end to present a pair of legs 14 between which plate 16 is positioned. After plate 16 is moved to place, rivets 18 anchor the parts together with a portion of plate 16 projecting longitudinally beyond the end of handle 10.

Head 12 has an opening therethrough, which opening comprises a socket portion 20 and a slot portion 22. Slot 22 communicates with socket 20 and projects outwardly from the bottom of the socket to receive the aforesaid projected portion of plate 16.

A cavity 24 in communication with slot portion 22 extends outwardly from two opposed edges of the slot to receive laterally extending lugs 26 created on plate 16. The opposed walls of head 12 which form slots 22 have sinuous surfaces 28 which interlock with sinuous faces 30 formed along a portion of the longitudinal edges of plate 16. These sinuous faces 30 are created along that part of plate 16 which projects longitudinally from the end of handle 10 and into slot portion 22.

Relatively deep notches 32 formed inwardly from the projected end of plate 16 each receives a wedge 34, which when moved completely to place, is positioned behind detent 36 formed integrally with plate 16.

Plate 16 is resilient enough to permit wedges 34 to be moved to the operative position where sinuous surfaces 28 and sinuous faces 30 are interengaged and the depth of cavities 24 is great enough to permit lugs 26 to move outwardly as wedges 34 are forced past detents 36.

When the parts are so associated as seen in Fig. 1, with the end of handle 10 against the bottom of socket portion 20 and with the projecting part of plate 16 in slot 22, relative movement between handle 10 and head 12 is virtually impossible. The width of slot 22 is appreciably less than the width of handle 10 and substantially the same as the width of plate 16.

In the form of the invention illustrated in Figs. 3, 4, 6 and 7, handle 50 is bifurcated in the same manner as afore set down, and head 52 has an opening therethrough which is divided into a socket portion 54 and slots 56. Cavities 58 extend outwardly from slots 56 and the opposed walls of head 52 forming cavities 56, have sinuous surfaces 60 to receive the sinuous faces 62 of plate 64.

Plate 64 has laterally extending lugs 66 to enter cavities 58, as above described, and relatively deep notches 68 extend inwardly from the end of plate 64 to receive wedges 70, each of which is specially formed to present laterally extending wings 72 that are reduced to a sharpened edge 74, at one end thereof. This type of wedge when driven to position behind detents 76, will expand the parts of plate 64 on each side of notches 68 so as to interlock the elements just described, and further, to tighten that portion of handle 10 on each side of the notched part of plate 64 so that it is held tightly against the walls of head 52 forming socket 54.

Hand tools embodying two forms of the invention have been illustrated and described, and in view of the manner in which the broad concepts of this invention might be built into other types of tools, it is desired to be limited in the embodiment of the invention only by the spirit thereof and scope of the appended claims.

Having thus described the invention, what is claimed as new and desired to be secured by Letters Patent is:

1. A hand tool of the character described comprising a head provided with an opening therethrough, said opening having a socket portion and a slot in communication with the socket; a bifurcated handle fitted into the socket of the head; a plate in the bifurcation of the handle having a deep notch extending inwardly from one end thereof intermediate the edges, and sinuous faces formed along the edges on each side of the notch; a sinuous surface formed in the slot in opposed relation with each sinuous face on the plate; and a wedge in the notch of the plate serving to hold the sinuous faces of the plate in engagement with the sinuous surfaces of the slot, a portion of said plate being extended beyond the handle and into the slot, said head having a pair of opposed cavities in communication with the slot near one end of the latter, said plate having laterally extending lugs at the end thereof formed to enter the cavities when the wedges are in place.

2. A hand tool of the character described comprising a head provided with an opening therethrough, said opening having a socket portion and a slot in communication with the socket; a bifurcated handle fitted into the socket of the head; a plate in the bifurcation of the handle having a deep notch extending inwardly from one end thereof intermediate the edges, and sinuous faces formed along the edges on each side of the notch; a sinuous surface formed in the slot in opposed relation with each sinuous face on the plate; and a wedge in the notch of the plate serving to hold the sinuous faces of the plate in engagement with the sinuous surfaces of the slot, a portion of said plate being extended beyond the handle and into the slot, said head having a pair of opposed cavities in communication with the slot near one end of the latter, said plate having laterally extending lugs at the end thereof formed to enter the cavities when the wedges are in place, said plate having a detent thereon to prevent accidental withdrawal of the wedge, said cavities being relatively deep with respect to the height of said lugs whereby the wedge may force the lugs outwardly as it is moved to the operative position beyond the detent.

3. A hand tool of the character described comprising a head provided with an opening therethrough, said opening having a socket portion and a slot in communication with the socket; a bifurcated handle fitted into the socket of the head; a plate in the bifurcation of the handle having a deep notch extending inwardly from one end thereof intermediate the edges, and sinuous faces formed along the edges on each side of the notch; a sinuous surface formed in the slot in opposed relation with each sinuous face on the plate; and a wedge in the notch of the plate serving to hold the sinuous faces of the plate in engagement with the sinuous surfaces of the slot, a portion of said plate being extended beyond the handle and into the slot, said wedge having laterally extending, tapered wings thereon for entering the handle on each side of the plate.

4. A hand tool of the character described comprising a head provided with an opening therethrough, said opening having a socket portion and a slot in communication with the socket; a bifurcated handle fitted into the socket of the head; a plate in the bifurcation of the handle having a deep notch extending inwardly from one end thereof intermediate the edges, and sinuous faces formed along the edges on each side of the notch; a sinuous surfaces formed in the slot in opposed relation with each sinuous face on the plate; and a wedge in the notch of the plate serving to hold the sinuous faces of the plate in engagement with the sinuous surfaces of the slot, a portion of said plate being extended beyond the handle and into the slot, said wedge having laterally extending, tapered wings thereon for entering the handle on each side of the plate, said wedge having a greater angle of inclination than the wings thereof whereby the plate is moved outwardly into the slot as the handle is tightened in the socket.

5. A hand tool of the character described comprising a head provided with an opening therethrough, said opening having a socket portion and a slot in communication with the socket; a bifurcated handle fitting into the socket of the head; a plate in the bifurcation of the handle having a pair of spaced, deep notches extending inwardly from one end thereof intermediate the edges, said edges of the plate having sinuous faces; a sinuous surface formed in the slot in opposed relation with each sinuous face on the plate; and a wedge in each notch of the plate serving to hold the sinuous faces of the plate in engagement with the sinuous surfaces of the slot, each of said wedges having laterally extending wings thereon provided with sharpened edges for entering the handle on each side of the plate to wedge the handle in said socket portion.

MORLEY PYSON JACKLINE.